United States Patent
Leigh et al.

[15] 3,681,359
[45] Aug. 1, 1972

[54] 2-ARYLOXYALKYLPIPERAZINE DERIVATIVES

[72] Inventors: Thomas Leigh; Alexander Henry Todd, both of Macclesfield, England

[73] Assignee: Imperial Chemical Industries Limited, London, England

[22] Filed: Feb. 7, 1969

[21] Appl. No.: 797,673

[30] Foreign Application Priority Data

Feb. 23, 1968 Great Britain...............8,918/68

[52] U.S. Cl.........260/268 BC, 260/79.5, 260/268 R, 260/619 R, 260/621 R, 260/621 N, 424/250
[51] Int. Cl. ............................................C07d 51/66
[58] Field of Search...........260/268, 268 SY, 268 BC

[56] References Cited

UNITED STATES PATENTS 3,560,503   2/1971   Anand ......................260/268 X
2,780,625   2/1957   Bach............................260/268
3,281,423   10/1966  Rogers.........................260/268
3,351,598   11/1967  Akkerman....................260/268

FOREIGN PATENTS OR APPLICATIONS 1,909,222   11/1969  Germany...................260/268 R

*Primary Examiner*—Donald G. Daus
*Attorney*—Cushman, Darby & Cushman

[57] ABSTRACT

The disclosure relates to 2-aryloxymethylpiperazine derivatives, processes for their manufacture, pharmaceutical compositions containing them and a method for using them to produce a thymoleptic effect or a central nervous depressant effect in warm-blooded animals. Representative of the compounds disclosed is 2-phenoxymethylpiperazine.

21 Claims, No Drawings

2-ARYLOXYALKYLPIPERAZINE DERIVATIVES

This invention relates to new piperazine derivatives which possess valuable therapeutic properties, for example they possess thymoleptic (anti-depressant) activity in warm-blooded animals as demonstrated by the reversal of reserpine-induced hypothermia in mice, and they are therefore useful in the treatment or prophylaxis of depressive illness in man. Furthermore, some of the compounds also possess depressant action on the central nervous system of warm-blooded animals as demonstrated by the reduction of spontaneous motility of mice, and these compounds are therefore useful in the treatment of anxiety and neurotic states in man.

According to the invention we provide new piperazine derivatives of the formula:

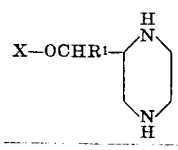

wherein $R^1$ stands for hydrogen or for an alkyl radical and wherein X stands for an aryl radical which may optionally be substituted, and the acid-addition salts thereof.

It is to be understood that the above definition of piperazine derivatives encompasses all possible stereoisomers thereof, and mixtures thereof.

As a suitable value for $R^1$ when it stands for an alkyl radical there may be mentioned, for example, an alkyl radical of up to five carbon atoms, for example the methyl radical.

As a suitable value for X there may be mentioned, for example, a phenyl or naphthyl radical which may optionally be substituted by one or more, for example one or two, substituents selected from halogen atoms, for example fluorine, chlorine, bromine and iodine atoms, alkyl, alkoxy and alkylthio radicals, for example alkyl, alkoxy and alkylthio radicals each of up to five carbon atoms, for example methyl, ethyl, n-propyl, isopropyl, n-butyl, t-butyl, t-amyl, methoxy, ethoxy, isopropoxy, n-butoxy, isobutoxy and methylthio radicals; acyl radicals, for example alkanoyl radicals of up to five carbon atoms, for example acetyl radicals; hydroxyalkyl radicals, for example hydroxyalkyl radicals of up to five carbon atoms, for example hydroxymethyl and 1-hydroxyethyl radicals; alkoxyalkyl radicals, for example alkyl radicals of up to five carbon atoms each of which is substituted by an alkoxy radical of up to five carbon atoms, for example 1-methoxyethyl radicals; alkenyl and alkenyloxy radicals, for example alkenyl and alkenyloxy radicals each of up to six carbon atoms, for example allyl and allyloxy radicals; aryl, aryloxy and aralkoxy radicals, for example aryl, aryloxy and aralkoxy radicals each of up to 10 carbon atoms, for example phenyl, phenoxy and benzyloxy radicals; acylamino radicals, for example alkanoylamino radicals of up to six carbon atoms, for example acetamido radicals; alkoxycarbonyl radicals, for example alkoxycarbonyl radicals of up to six carbon atoms, for example methoxycarbonyl and ethoxycarbonyl radicals; hydroxy, amino, carboxy, methylenedioxy and nitro radicals; and alkylene radicals, for example alkylene radicals of three or four carbon atoms, for example trimethylene and tetramethylene radicals (that is, those radicals which, together with the aryl radical X, form an indanyl or tetrahydronaphthyl radical, for example the 4-indanyl, 5-indanyl, 5,6,7,8-tetrahydro-1-naphthyl or 5,6,7,8-tetrahydro-2-naphthyl radical). Preferably the phenyl or naphthyl radical X is unsubstituted or bears a single substituent selected from those defined above.

As suitable acid-addition salts of the piperazine derivatives of the invention there may be mentioned, for example, salts derived from an inorganic or organic acid, for example hydrochlorides, hydrobromides, phosphates, sulphates, oxalates, lactates, tartrates, acetates, salicylates, citrates, benzoates, β-naphthoates, adipates or 1,1-methylene-bis-(2-hydroxy-3-naphthoates), or acid-addition salts derived from acidic synthetic resins, for example sulphonated polystyrene resins.

Particular new piperazine derivatives of the invention are those hereinafter described in the Examples, and of these, preferred compounds which possess depressant action on the central nervous system are 2-phenoxymethyl-, 2-(o-ethoxyphenoxymethyl)-, 2-(m-methoxy-phenoxymethyl)-, 2-(m-tolyloxymethyl)-, 2-(o-phenylphenoxymethyl)-, 2-(4-indanyloxymethyl)-, 2-(o-methoxycarbonylphenoxymethyl)-, 2-(o-n-propylphenoxymethyl)-, 2-(o-allylphenoxymethyl)- and 2-(o-tolyloxymethyl)- piperazine and the acid-addition salts thereof.

Preferred compounds which possess thymoleptic activity are 2-phenoxymethyl-, 2-(o-ethoxyphenoxymethyl)-, 2-(1-naphthyloxymethyl)-, 2-(p-acetamidophenoxymethyl)-, 2-(o-methylthiophenoxymethyl)-, 2-(o-acetylphenoxymethyl)-, 2-(o-n-propylphenoxymethyl)-, 2-(o-allyl-phenoxymethyl)-, 2-(m-nitrophenoxymethyl)-, 2-(m-aminophenoxymethyl)-, 2-(o-carboxyphenoxymethyl)-, 2-[o-(1-methoxyethyl)phenoxymethyl]2-(o-tolyloxymethyl)- piperazine and the acid-addition salts thereof.

According to a further feature of the invention we provide a process for the manufacture of the piperazine derivatives of the invention which comprises the removal of the α-arylalkyl radicals from a compound of the formula:

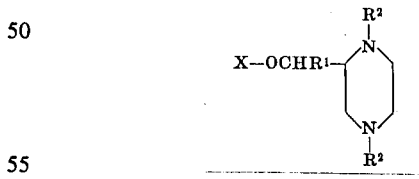

wherein $R^1$ and X have the meanings stated above and wherein $R^2$ stands for an α-aryalkyl radical, or from an acid-addition salt thereof.

A suitable α-arylalkyl radical is, for example, the benzyl radical. The α-arylalkyl radicals may be removed by hydrogenolysis, for example by means of hydrogen in the presence of a catalyst, for example palladium, in a diluent or solvent, for example ethanol. The hydrogenolysis may be carried out at a temperature of between 20° and 25° C., and it may be carried out at atmospheric pressure or at a pressure of up to 100 atmospheres. Alternatively, the α-arylalkyl radicals may be removed by interaction of the starting material with an alkyl or aryl chloroformate, for example methyl, ethyl or phenyl chloroformate, in a diluent or solvent, for example benzene, for example at the boiling point of said diluent or solvent, followed by hydrolysis of the alkoxy- or aryloxy-carbonyl derivative thereby obtained, for example with an aqueous, alcoholic or aqueous alcoholic solution of an alkali metal hydroxide, for example potassium hydroxide.

It is to be understood that when the aryl radical X bears a substituent which may be affected by reducing conditions such as those used in hydrogenolysis, then if it is desired that the said substituent be maintained, non-reducing conditions such as those provided by use of a chloroformate and hydrolysis must be used. Alternatively, it is to be understood that the substituent in the aryl radical X may be altered during the process of the invention, for example an alkenyl radical may be reduced to an alkyl radical; the nitro radical may be reduced to the amino radical; and an aralkyloxy or aralkyloxycarbonyl radical may be hydrogenolyzed to the hydroxy or carboxy radical respectively.

The starting material used in the abovementioned process may be obtained by the interaction of a piperazine derivative of the formula:

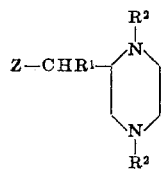

wherein $R^1$ and $R^2$ have the meanings stated above and wherein Z stands for a halogen atom, for example the chlorine or bromine atom, or an acid-addition salt thereof, with a compound of the formula X-OH, wherein X has the meaning stated above, or a metal derivative thereof, for example, an alkali metal derivative, for example the sodium derivative. The interaction may be accelerated or completed by the application of heat, for example by heating to a temperature of between 90° and 200° C., and it may be carried out in a diluent or solvent, for example N,N-dimethylformamide or an excess of the compound of the formula X-OH, wherein X has the meaning stated above.

The piperazine derivatives used as intermediates may be obtained, as generally described in the article by Jucker and Rissi in Helvetica Chimica Acta, 1962, 45, 2383, by the interaction of a diamine of the formula $R^2NH.CH_2CH_2.NHR^2$, wherein $R^2$ has the meaning stated above, with a dihalogeno compound of the formula $ZCH_2.CHZ.COR^3$, wherein Z has the meaning stated above and wherein $R^3$ stands for a lower alkoxy or alkyl radical, for example the ethoxy or methyl radical, followed by the reduction with a complex metal hydride, for example lithium aluminum hydride or sodium borohydride, of the 2-alkoxycarbonyl- or 2-acyl-piperazine derivative thus obtained to the corresponding 2-(α-hydroxyalkyl)piperazine derivative, and the subsequent conversion of that compound to the corresponding 2-(α-halogenoalkyl)piperazine derivative, for example by means of thionyl chloride. It is to be understood that when $R^3$ stands for an alkyl radical, $R^1$ in the product will stand for the same alkyl radical.

Piperazine derivatives of the invention wherein X bears a functional substituent may be converted into different piperazine derivatives of the invention wherein X bears a different substituent by conventional means. Thus, for example, an alkanoyl substituent in the radical X may be reduced to the corresponding hydroxyalkyl substituent, for example by reduction with sodium borohydride, or an α-hydroxyalkyl substituent in the radical X may be reduced to the corresponding alkyl radical, for example by hydrogenation.

According to a further feature of the invention we provide pharmaceutical compositions which comprise as active ingredient at least one of the piperazine derivatives of the invention, or an acid-addition salt thereof, in association with a pharmaceutically acceptable diluent or carrier therefor.

The pharmaceutical compositions may be, for example, in a form suitable for oral or parenteral administration, for which purposes they may be formulated by means known to the art into the form of, for example, tablets, capsules, aqueous or oily solutions or suspensions, emulsions, injectable aqueous or oily solutions or suspensions, or dispersible powders.

The pharmaceutical compositions of the invention may also contain, in addition to the piperazine derivative or acid-addition salt thereof, one or more known drugs selected from neuroleptic agents, for example chlorpromazine, prochlorperazine, trifluoperazine and haloperidol; other sedative drugs and tranquillizers, for example chlordiazepoxide, phenobarbitone and amylobarbitone; anticonvulsant drugs, for example primidone and phenytoin; Δ-adrenergic blocking agents, for example propranolol; drugs used in the treatment of Parkinson's disease, for example benzhexol; and other antidepressant drugs, for example imipramine, desipramine, amitriptyline, nortriptyline, drugs of the amphetamine type and monoamineoxidase inhibitors, for example phenelzine and mebanazine.

Preferred pharmaceutical compositions of the invention are those suitable for oral administration in unit dosage form, for example tablets and capsules, which contain between 10 and 100 mg. of active ingredient.

Two pharmaceutical compositions of the invention will normally be administered to man, both for the treatment of anxiety and neurotic states and for the treatment or prophylaxis of depressive illness, at such a dose that each patient receives a total of between 5 and 400 mg. of active ingredient per day, and preferably, if a highly active compound is used, a total of between 10 and 100 mg. per day, the composition being administered three or four times per day.

The invention is illustrated but not limited by the following Examples:

Example 1

A mixture of 46.5 g. of 1,4-dibenzyl-2-phenoxymethylpiperazine dihydrochloride, 1500 ml. of ethanol and 33 g. of a 5 percent palladium-on-charcoal catalyst is stirred for two days at a temperature of 20°–25 C. under a pressure of 100 atmospheres of hydrogen. The mixture is filtered, the filtrate is evaporated to dryness and the residue is crystallized from ethanol. There is thus obtained 2-phenoxymethylpiperazine dihydrochloride, m.p. 250° C.

The 1,4-dibenzyl-2-phenoxymethylpiperazine dihydrochloride used as starting material may be obtained as follows:

A solution of 46 g. of thionyl chloride in 160 ml. of carbon tetrachloride is added during fifteen minutes to a stirred solution of 54 g. of 1,4-dibenzyl-2-hydroxymethylpiperazine in 160 ml. of carbon tetrachloride. The mixture is then heated at 70° C. for one hour and cooled to 0° C., and 150 ml. of 50 percent aqueous potassium hydroxide solution are added. The carbon tetrachloride layer is separated, washed with water, dried over magnesium sulphate and evaporated to dryness. The residue is crystallized from petroleum ether (b.p. 40°–60° C.) at −20° C. and there is thus obtained 1,4-dibenzyl-2-chloromethylpiperazine, m.p. 52°–55° C.

43G. of 1,4-dibenzyl-2-chloromethylpiperazine are added to a stirred mixture of 500 g. of phenol and 70 g. of sodium phenate which is maintained at a temperature of 90° C. The mixture is then heated and stirred at 150° C. for 12 hours, cooled to 110° C. and poured into three liters of water. The aqueous mixture is extracted with ether and ethereal solution is washed with aqueous sodium hydroxide solution, dried and evaporated to dryness. The residue is dissolved in ether and ethereal hydrogen chloride solution is added until precipitation of solid is complete. The mixture is filtered and the solid residue is crystallized from ethanol. There is thus obtained 1,4-dibenzyl-2-phenoxymethylpiperazine dihydrochloride, m.p. 206° C.

Example 2

A solution of 4.1 g. of 1,4-dibenzyl-2-(o-ethoxyphenoxymethyl)-piperazine dihydrochloride in 100 ml. of ethanol is shaken with 0.5 g. of a 5 percent palladium-on-charcoal catalyst in an atmosphere of hydrogen at a temperature of 20°–25° C. and at atmospheric pressure until the uptake of hydrogen ceases. The mixture is filtered, the filtrate is evaporated to dryness and the residue is crystallized from a mixture of methanol and ethyl acetate. There is thus obtained 2-(o-ethoxyphenoxymethyl)piperazine dihydrochloride hemihydrate, m.p. 216°–220° C.

The 1,4-dibenzyl-2-(o-ethoxyphenoxymethyl)piperazine used as starting material may be obtained as follows:

0.36 G. of sodium is added to 10 ml. of o-ethoxyphenol which are kept at a temperature of 20°–25° C., and the mixture is heated until all the sodium has dissolved. The mixture is cooled, 4.9 g. of 1,4-dibenzyl-2-chloromethylpiperazine are added and the mixture is heated at 200° C. for 45 minutes. The mixture is cooled and partitioned between ethyl acetate and water, and the organic layer is separated, washed successively with two portions of aqueous sodium hydroxide solution and one portion of water, dried and evaporated to dryness. The residue is dissolved in ethyl acetate and ethereal hydrogen chloride solution is added until precipitation of solid is complete. The mixture is filtered and the solid residue is crystallized from a mixture of methanol and ethyl acetate. There is thus obtained 1,4-dibenzyl-2-(o-ethoxyphenoxymethyl)-piperazine dihydrochloride, m.p. 185°–189° C.

The process described above is repeated except that the o-ethoxyphenol is replaced by an equivalent quantity of m-methoxyphenol. There is thus obtained 2-(m-methoxyphenoxymethyl)piperazine dihydrochloride, m.p. 185°–189° C.

The process described above is repeated except that the o-ethoxyphenol is replaced by an equivalent quantity of m-cresol. There is thus obtained 2-(m-tolyloxymethyl)piperazine dihydrochloride, m.p. 208°–212° C.

Example 3

A solution of 2 g. of 1,4-dibenzyl-2-(o-phenylphenoxymethyl)-piperazine dihydrochloride in a mixture of 25 ml. of ethanol and 8 ml. of water is shaken with 1 g. of a 5 percent palladium-on-charcoal catalyst in an atmosphere of hydrogen at a temperature of 20°–25 C. and at atmospheric pressure until the uptake of hydrogen ceases. The mixture is filtered, the filtrate is evaporated to dryness and the residue is crystallized from methanol. There is thus obtained 2-(o-phenylphenoxymethyl)piperazine dihydrochloride hemihydrate, m.p. 279°–281° C.

The 1,4-dibenzyl-2-(o-phenylphenoxymethyl)piperazine dihydrochloride used as starting material may be obtained as follows:

Sodium hydride (1 g. of a 50 percent dispersion in oil) is added to a stirred solution of 3.8 g. of o-phenylphenol in 25 ml. of dry dimethylformamide, the temperature of the mixture being kept between 5° and 10° C. The mixture is warmed to room temperature and a solution of 6.4 g. of 1,4-dibenzyl-2-chloromethylpiperazine in 25 ml. of dimethylformamide is added. The mixture is stirred and heated at 140°–150° C. for 2 hours and is then cooled and filtered, and the filtrate is evaporated to dryness under reduced pressure. The residue is shaken with a mixture of water and ether and the ethereal layer is separated, washed with aqueous 2N-sodium hydroxide solution and then with water, and dried over sodium sulphate. Ethereal hydrogen chloride solution is added and the mixture is filtered. The precipitated hydrochloride is triturated with acetone, the mixture is filtered and the solid residue is crystallized from methanol. There is thus obtained 1,4-dibenzyl-2-(o-phenylphenoxy-methyl)piperazine dihydrochloride, m.p. 233° –234° C. with decomposition.

The process described above is repeated except that the appropriate phenol is used in place of o-phenylphenol, and there are thus obtained the compounds described in the following table:

| aryloxy substituent | salt | m.p. (°C.) |
| --- | --- | --- |
| m-phenoxyphenoxy | dihydrochloride hemihydrate | 302–304 (with decomposition) |
| 1-naphthyloxy | dihydrochloride hemihydrate | 305–306 (with decomposition) |
| o-hydroxyphenoxy* | dihydrochloride monohydrate | 288–290 |
| 4-indanyloxy | dihydrochloride | 300–302 (with decomposition) |
| 1,3-benzodioxol-5-yloxy | dihydrochloride hemihydrate | 240–241 (with decomposition) |

*1,4-dibenzyl-2-(o-benzyloxyphenoxymethyl)piperazine dihydrochloride used as starting material.

Example 4

The process described in Example 2 is repeated except that the appropriate 1,4-dibenzyl-2-aryloxymethylpiperazine dihydrochloride is used as starting material in place of 1,4-dibenzyl-2-(o-ethoxy-phenoxymethyl)piperazine dihydrochloride. There are thus obtained the compounds described in the following tablet:

| aryloxy substituent | salt | m.p. (°C.) |
|---|---|---|
| p-acetamidophenoxy | sesquioxalate | 242 (with decomposition) |
| o-acetylphenoxy | dihydrochloride hemihydrate | 166–169 |
| o-methoxycarbonylphenoxy | dihydrochloride hemihydrate | 192–194 |
| o-n-propylphenoxy* | dihydrochloride | 227–229 |
| o-carboxyphenoxy** | dihydrochloride | 168–172 |
| o-hydroxymethylphenoxy | dihydrochloride | 180–182 |

*1,4-dibenzyl-2-(o-allylphenoxymethyl)piperazine dihydrochloride used as starting material.
**1,4-dibenzyl-2-(o-benzyloxycarbonylphenoxymethyl)-piperazine dihydrochloride used as starting material.

Example 5

A mixture of 12.0 g. of 1,4-dibenzyl-2-(m-nitrophenoxy-methyl)piperazine monooxalate, 2.54 g. of oxalic acid dihydrate, 8.0 g. of a 5 percent palladium-on-carbon catalyst, 120 ml. of methylated spirit and 80 ml. of water is shaken with hydrogen at a temperature of 20°–25° C. and at atmospheric pressure until uptake of hydrogen ceases. The mixture is filtered, the filtrate is evaporated to dryness and the residue is triturated with methanol and with ethanol. The solid product is collected and crystallized from aqueous ethanol. Thus there is obtained 2-(m-aminophenoxymethyl)piperazine sesquioxalate hemihydrate, m.p. 222°–224° C. (with decomposition).

Example 6

A mixture of 3.6 g. of 1,4-dibenzyl-2-(o-methylthiophenoxy-methyl)piperazine (prepared by conventional means from the dihydrochloride), 100 ml. of benzene and 15.75 g. of phenylchloroformate is heated under reflux for four hours. The benzene is removed by evaporation and to the residue is added a solution of 25 g. of potassium hydroxide in 150 ml. of ethanol. The mixture is heated under reflux for 64 hours and then filtered. The filtrate is evaporated to dryness and the residual solid is partitioned between ethyl acetate and water. The ethyl acetate layer is separated and extracted with dilute hydrochloric acid, and the acidic extract is made alkaline and extracted with ethyl acetate. The ethyl acetate extract is washed with water, dried over magnesium sulphate and evaporated to dryness. The residue is dissolved in ether and a solution of hydrogen chloride in ether is added until the precipitation of solid is complete. The mixture is filtered and the solid product is crystallized from methanol. There is thus obtained 2-(o-methylthiophenoxymethyl)piperazine dihydrochloride, m.p. 296°–298° C.

The process described above is repeated except that 1,4-dibenzyl-2-(o-allylphenoxymethyl)piperazine is used as starting material in place of 1,4-dibenzyl-2-(o-methylthiophenoxymethyl)-piperazine. There is thus obtained 2-(o-allylphenoxymethyl)-piperazine dihydrochloride hemihydrate, m.p. 248°–250° C. after crystallization from a mixture of methanol and ether.

The process described above is repeated except that 1,4-dibenzyl-2-(m-nitrophenoxymethyl)piperazine is used as starting material in place of 1,4-dibenzyl-2-(o-methylthiphenoxymethyl)-piperazine, and that the product is isolated as the oxalate salt. There is thus obtained 2-(m-nitrophenoxymethyl)piperazine monooxalate, m.p. 244°–246° C. (with decomposition) after crystallization from aqueous acetone.

The process described above is repeated except that 1,4-dibenzyl-2-(m-chlorophenoxymethyl)piperazine is used as starting material in place of 1,4-dibenzyl-2-(o-methylthiophenoxymethyl)-piperazine. There is thus obtained 2-(m-chlorophenoxymethyl)-piperazine dihydrochloride monohydrate, m.p. 264°–268° C. (with decomposition) after crystallization from ethanol.

The 1,4-dibenzyl-2-aryloxymethylpiperazines used as starting materials in the foregoing Examples 3 to 6 may be obtained by a similar process to that described in the second part of Example 3, and some of these are characterized by the melting points shown in the following table:

| aryloxy substituent | salt | m.p. (°C.) |
|---|---|---|
| m-phenoxyphenoxy | dihydrochloride hemihydrate | 203–204 |
| 1-naphthyloxy | dihydrochloride | 232–234 |
| o-benzyloxyphenoxy | dihydrochloride | 214–215 |
| 4-indanyloxy | dihydrochloride | 227–228 |
| o-acetylphenoxy | dihydrochloride | 193–198 |
| o-methoxycarbonylphenoxy | dihydrochloride | 200–202 |
| o-benzyloxycarbonylphenoxy | dihydrochloride | 164–168 |
| 1,3-benzodioxol-5-yloxy | dihydrochloride hemihydrate | 217–218 (with decomposition) |
| m-nitrophenoxy | mono-oxalate | 171–175 (with decomposition) |
| m-chlorophenoxy | dioxalate monohydrate | 170–172 (with decomposition) |

Example 7

Sodium borohydride (0.7 g.) is added in small portions to a stirred solution of 0.8 g. of 2-(o-acetylphenoxymethyl)piperazine dihydrochloride in 60 ml. of methylated spirit. The mixture is stirred at ambient temperature for three hours, the solvent is removed by distillation under reduced pressure and the residue is partitioned between water and chloroform. The aqueous layer is extracted twice with chloroform, the combined chloroform solutions are washed and dried and the solvent is removed by distillation under reduced pressure. The residue, which consists of 2-(o-1-hydroxyethylphenoxymethyl)piperazine, is converted by conventional means to its hydrochloride which is crystallized from methanol. There is thus obtained 2-(o-1-methoxyethylphenoxymethyl)piperazine dihydrochloride hemihydrate, m.p. 215°–220°° C., the methyl group being introduced from the methanol used for crystallization.

Example 8

A solution of 1.5 g. of 2-(o-hydroxymethylphenoxymethyl)- dihydrochloride in 50 ml. of aqueous ethanol is shaken with hydrogen in the presence of a 30 percent palladium-on-charcoal catalyst at a temperature of 20°–25 C. and at atmospheric pressure until one molecular proportion of hydrogen has been absorbed. The mixture is filtered, the filtrate is evaporated to dryness and the residue is crystallized from aqueous methanol. There is thus obtained 2-(o-tolyloxymethyl)piperazine dihydrochloride hemihydrate, m.p. 264°–266° C.

Example 9

A solution of 11.5 g. of one of the diastereoisomeric racemates of 1,4-dibenzyl-2-α-phenoxyethylpiperazine mono-oxalate in 350 ml. of methanol is shaken with hydrogen in the presence of 5.0 g. of a 5 percent palladium-on-carbon catalyst at a temperature of 20°–25° C. and at atmospheric pressure until uptake of hydrogen ceases. The mixture is filtered, the solid residue is washed with 1,000 ml. of boiling water and the combined methanolic filtrate and aqueous washings are concentrated to small volume and cooled. The mixture is filtered and the solid product is crystallized from water. There is thus obtained one diastereoisomeric racemate of 2-(α-phenoxyethyl)piperazine mono-oxalate, m.p. 278°–280° C. with decomposition. The corresponding dipicrate salt has m.p. 245°–250° C. with decomposition. 250°

The 1,4-dibenzyl-2-α-phenoxyethylpiperazine mono-oxalate used as starting material may be obtained as follows:

A solution of 300 g. of 3,4-dibromobutan-2-one in 1,300 ml. of benzene is added dropwise during 1 hour to a stirred solution of 329 g. of N,N'-dibenzylethylenediamine and 264 g. of triethylamine in 900 ml. of benzene which is maintained at 40° C. The mixture is heated under reflux for four hours, cooled and filtered. The filtrate is treated with charcoal and filtered and the filtrate is evaporated to dryness. The residue is dissolved in light petroleum (b.p. 30°–40° C.), the solution is treated with charcoal and the mixture is filtered. The filtrate is concentrated to small volume, cooled to 0° C. and kept until crystallization is complete. The product is filtered off and crystallized from light petroleum (b.p. 30°–40° C.). Thus there is obtained racemic 2-acetyl-1,4-dibenzylpiperazine, m.p. 52°–55° C. The corresponding dipicrate has m.p. 172° C.

3.1 G. of sodium borohydride are added portionwise to a stirred solution of 50.0 g. of racemic 2-acetyl-1,4-dibenzylpiperazine in 300 ml. of ethanol which is kept at 10° C. The mixture is stirred at 0° C. for one hour, and then at 20°–25° C. for 17 hours. The mixture is cooled to 10° C., 5 ml. of glacial acetic acid are added, and the mixture is evaporated to dryness under reduced pressure. To the residue are added 100 ml. of water and sufficient 50 percent aqueous potassium hydroxide solution to bring the pH of the mixture to 10, and the mixture is extracted with chloroform. The extract is dried and evaporated to dryness and there is thus obtained a mixture of the diastereoisomeric racemates of 1,4-dibenzyl-2-α-hydroxyethylpiperazine as an oil, which is characterized as the dipicrate, m.p. 216°–219° C.

A solution of 50.0 g. of the above 1,4-dibenzyl-2-α-hydroxyethylpiperazine in 200 ml. of carbon tetrachloride is added dropwise to a stirred solution of 48 g. of thionyl chloride in 150 ml. of carbon tetrachloride which is kept at 0° C. The mixture is heated under reflux for 1 hour and then cooled to 0° C., and 183 ml. of aqueous 17.5N sodium hydroxide solution are added. The mixture is filtered and the solid is washed with carbon tetrachloride. The organic layer of the two-phase combined filtrate and washings is separated, washed with water, dried over sodium sulphate and evaporated to dryness. The residue is crystallized from light petroleum (b.p. 30°–40° C.) and there is thus obtained a mixture of the diastereoisomeric racemates of 1,4-dibenzyl-2-α-chloroethylpiperazine, m.p. 64°–66° C.

A solution of 9.4 g. of phenol in 100 ml. of dimethylformamide is added dropwise to a stirred suspension of 4.8 g. of a 50 percent dispersion of sodium hydride in mineral oil in 100 ml. of dimethylformamide. When reaction is complete a solution of 32.9 g. of the above 1,4-dibenzyl-2-α-chloroethylpiperazine in 200 ml. of dimethylformamide is added and the mixture is heated under reflux for 24 hours. The mixture is evaporated to dryness under reduced pressure and the residue is shaken with water and ethyl acetate. The organic layer is separated, washed with water, dried with potassium carbonate and evaporated to dryness. The residue is dissolved in light petroleum (b.p. 30°–40° C.), the solution is treated with charcoal and then filtered, and the filtrate is evaporated to dryness. There is thus obtained a mixture of the diastereoisomeric racemates of 1,4-dibenzyl-2-α-phenoxyethylpiperazine as an oil.

A solution of 33.0 g. of the above 1,4-dibenzyl-2-α-phenoxyethylpiperazine in 250 ml. of acetone is added to a solution of 13.2 g. of anhydrous oxalic acid in 100 ml. of acetone. The solution is concentrated to small volume by evaporation under reduced pressure and is then filtered. The filtrate is further concentrated and is then diluted with ether and filtered. The total solid (37.0 g.) thus obtained is dissolved in 385 ml. of warm methylated spirit, the solution is allowed to cool and 180 ml. of ether are added. The solution is seeded, kept at 20°–25° C. for three hours, and then filtered. Thus there is obtained 19.5 g. of one diastereoisomeric racemate of 1,4-dibenzyl-2-α-phenoxyethylpiperazine mono-oxalate, m.p. 176°–178° C. with decomposition. The corresponding dipicrate has m.p. 218° C. with decomposition.

The filtrate from the final crystallization is concentrated and filtered, and there is thus obtained 14.2 g. of a mixture of the diastereoisomeric racemates of 1,4-dibenzyl-2-α-phenoxyethyl-piperazine oxalate, m.p. 125°–140° C. with decomposition. The dipicrate of the mixed racemates melts between 150° and 203° C. with decomposition.

Example 10

A mixture of the diastereoisomeric racemates of 1,4-dibenzyl-2-α-phenoxyethylpiperazine oxalate is hydrogenolyzed by a similar process to that described in Example 9. The mixture is filtered, the solid is washed with cold water and the combined filtrate and washings are evaporated to dryness under reduced pressure. The solid residue is washed with acetone and suspended in methanol, and 5 percent methanolic potassium hydroxide solution is added until the pH of the mixture is 11–12. The mixture is filtered, the filtrate is evaporated to dryness and the residue is extracted with light petroleum (b.p. 40°–60° C.). The extract is evaporated to dryness and there is thus obtained a mixture of the diastereoisomeric racemates of 2-α-phenoxyethylpiperazine as an oil.

The pharmacological properties of the piperazine derivatives of the invention are demonstrated by the following tests:

A. Reversal of Reserpine-Induced Hypothermia in Mice

All clinically useful antidepressants have a calorigenic action in reserpinised mice, and this test is the one primarily used for establishing relative antidepressant activity in a series of related compounds. The test (known as the RHL test) is carried out as follows:

Each member of various groups of six mice was given reserpine (2mg. of base per kg. bodyweight, given subcutaneously, as the phosphate). Seventeen hours later, the gastric temperature (To) of each mouse was recorded by means of an orally-inserted probe coupled to an electric thermometer which was calibrated in degrees Centigrade and which could be read to 0.05° C. Immediately after the temperature measurement, the mice were dosed orally with the test compound or with saline (controls), each mouse in a group of six being given the same substance, and the gastric temperatures were again recorded at intervals of two, four and six hours. The temperatures of the mice after these intervals were designated $T_2$, $T_4$ and $T_6$ respectively.

The effect of the test compound was computed from the mean cumulative rise in a temperatures at the intervals of two, four and six hours. The means cumulative difference in temperature (C) is thus defined as the mean, calculated from the results obtained in 6 mice, of the sum:

$$T_2 + T_4 + T_6 - 3T_o$$

The effect of the test compound is related to the dose and, using suitable doses, a dose of compound can be defined which gives a mean cumulative rise in temperature of 10° C. greater than that of control mice. This dose is called the $ED_{10}$, and the results obtained with the piperazine derivatives of the invention are shown in the table below, the doses being recorded in mg. per kg. bodyweight.

B. Reduction of Locomotor Activity in Mice

Compounds which possess sedative activity reduce the spontaneous locomotor activity of mice, and the effect of compounds on such activity is measured by the following test procedure:

Each mouse in various groups of eight mice was placed in an individual metal cage 12 cm. × 30 cm. in area and 10 cm. high which was traversed by a beam of light. Every interruption of the light beam caused by the mouse crossing the beam was counted electronically, and the number of interruptions in each cage in 60 minutes was determined.

Each mouse in one group of eight mice was given an oral dose of saline solution, and each mouse in another group of eight mice was given an oral dose of the compound being tested. Each mouse was then returned to its original cage and the number of beam interruptions in a further period of 60 minutes was determined. The ratio ($R_1$) of the total number of beam interruptions caused by the 8 mice in the treated group to the total number of beam interruptions caused by the same 8 mice before treatment was determined at various dose levels of the compound, and the ratio ($R_2$) of the total number of beam interruptions caused by the eight mice in the control group to the total number of beam interruptions caused by the same eight mice before administration of saline was also determined. The ratio $R_1/R_2$ was then plotted against the dose of compound, and the dose (the $ED_{50}$) of compound which produced a ratio $R_1/R_2 = 0.5$ was calculated. The results obtained in this test (known as the LAR test) are shown in the table below, the doses being recorded in mg. per kg. bodyweight.

RESULTS

The results obtained in the above tests with a representative selection of the piperazine derivatives of the invention were as follows:

The compounds tested have the formula:

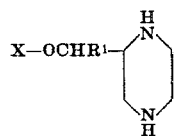

| X | $R^1$ | RHL $ED_{10}$ | LAR $ED_{50}$ |
|---|---|---|---|
| phenyl | H | 0.3–1 | <10 |
| o-ethoxyphenyl | H | 0.3–1 | 20 |
| m-methoxyphenyl | H | | 10 |
| m-tolyl | H | 10–30 | 20 |
| o-phenylphenyl | H | 10–30 | 30 |
| 1-naphthyl | H | 10–30 | 100 |
| 4-indanyl | H | 100 | 30 |
| p-acetamidophenyl | H | 1–10 | 100 |
| o-methylthiophenyl | H | <10 | – |
| o-acetylphenyl | H | 0.3–1 | – |
| o-methoxycarbonylphenyl | H | | 30 |
| o-n-propylphenyl | H | 10–30 | 30 |
| o-allylphenyl | H | <10 | 10–30 |
| m-nitrophenyl | H | 10 | – |
| m-aminophenyl | H | 10–30 | – |
| o-carboxyphenyl | H | 10–30 | – |
| o-(1-methoxyethyl) | H | <10 | – |
| o-tolyl | H | 1–3 | 10 |
| phenyl | Me | 10 | – |

What we claim is:
1. A piperazine of the formula:

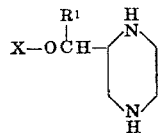

wherein $R^1$ stands for hydrogen or methyl and wherein X stands for phenyl or naphthyl of phenyl or naphthyl substituted by a substituent selected from halogen atoms; alkyl, alkoxy and alkylthio each of up to five carbon atoms; acetyl, hydroxymethyl, 1-methoxyethyl, allyl, alloxy, acetamido, methoxycarbonyl, phenyl, phenoxy, benzyloxy, hydroxy, amino, carboxy, adjacent methylenedioxy, nitro, and adjacent alkylene of three or four carbon atoms; and the non-toxic acid addition salts thereof.

2. A piperazine as claimed in claim 1 wherein $R^1$ stands for hydrogen or methyl and wherein X stands for phenyl or naphthyl or phenyl which bears one substituent selected from fluorine, chlorine, bromine and iodine atoms and methyl, ethyl, n-propyl, isopropyl, n-butyl, t-butyl, t-amyl, methoxy, ethoxy, isopropoxy, n-butoxy, isobutoxy, methylthio, acetyl, hydroxymethyl, 1-methoxyethyl, allyl, allyloxy, phenyl, phenoxy, benzyloxy, acetamido, methoxy-carbonyl, hydroxy, amino, carboxy, adjacent methylenedioxy, nitro, adjacent trimethylene and adjacent tetramethylene; and the non-toxic acid-addition salts thereof.

3. An acid-addition salt as claimed in claim 1 which is selected from the group consisting of hydrochlorides, hydrobromides, phosphates, sulphates, oxalates, lactates, tartrates, acetates, gluconates, salicylates, citrates, ascorbates, benzoates, Δ-naphthoates, adipates or 1,1-methylene-bis-(2-hydroxy-3-naphthoates) of the piperazines claimed in claim 1.

4. A compound according to claim 1 selected from 2-(o-ethoxyphenoxymethyl)piperazine and the non-toxic acid-addition salts thereof.

5. A compound according to claim 1 selected from 2-(m-methoxyphenoxymethyl)piperazine and the non-toxic acid-addition salts thereof.

6. A compound according to claim 1 selected from 2-(m-tolyloxymethyl)piperazine and the non-toxic acid-addition salts thereof.

7. A compound according to claim 1 selected from 2-(o-phenylphenoxymethyl)piperazine and the non-toxic acid-addition salts thereof.

8. A compound according to claim 1 selected from 2-(4-indanyloxymethyl)piperazine and the non-toxic acid-addition salts thereof.

9. A compound according to claim 1 selected from 2-(1-naphthyloxymethyl)piperazine and the non-toxic acid-addition salts thereof.

10. A compound according to claim 1 selected from 2-(o-methylthiophenoxymethyl)-piperazine and the non-toxic acid-addition salts thereof.

11. A compound according to claim 1 selected from 2-p(p-acetamidophenoxymethyl)piperazine and the non-toxic acid-addition salts thereof.

12. A compound according to claim 1 selected from 2-(o-acetylphenoxymethyl)piperazine and the non-toxic acid-addition salts thereof.

13. A compound according to claim 1 selected from 2-(o-methoxycarbonylphenoxymethyl)-piperazine and the non-toxic acid-addition salts thereof.

14. A compound according to claim 1 selected from 2-(o-n-propylphenoxymethyl)piperazine and the non-toxic acid-addition salts thereof.

15. A compound according to claim 1 selected from 2-(o-allylphenoxymethyl)piperazine and the non-toxic acid-addition salts thereof.

16. A compound according to claim 1 selected from 2-(m-nitrophenoxymethyl)piperazine and the non-toxic acid-addition salts thereof.

17. A compound according to claim 1 selected from 2-(m-aminophenoxymethyl)piperazine and the non-toxic acid-addition salts thereof.

18. A compound according to claim 1 selected from 2-(o-carboxyphenoxymethyl)-piperazine and the non-toxic acid-addition salts thereof.

19. A compound according to claim 1 selected from 2-piperazine and the non-toxic acid-addition salts thereof.

20. A compound according to claim 1 selected from 2-(o-tolyloxymethyl)piperazine and the non-toxic acid-addition salts thereof.

21. A compound according to claim 15 selected from 2-phenoxymethylpiperazine and the non-toxic acid-addition salts thereof.

* * * * *